United States Patent [19]
Engstrom et al.

[11] 3,976,875
[45] Aug. 24, 1976

[54] PHOTODETECTOR FILTER STRUCTURE

[75] Inventors: Ralph Warren Engstrom; David Eugene Bowser, both of Lancaster, Pa.

[73] Assignee: RCA Corporation, New York, N.Y.

[22] Filed: June 24, 1975

[21] Appl. No.: 589,853

[52] U.S. Cl. ............................. 250/226; 250/216; 350/311; 350/316
[51] Int. Cl.² ...................... G01J 3/34; G01J 3/50
[58] Field of Search ............... 250/226, 239, 211 R, 250/211 J, 225, 228, 216; 350/311, 313, 316, 318, 148; 356/186

[56] References Cited
UNITED STATES PATENTS

| | | | |
|---|---|---|---|
| 2,798,943 | 7/1957 | Prideaux | 350/311 X |
| 3,278,752 | 10/1966 | Brixner | 356/186 X |
| 3,567,948 | 3/1971 | Oke et al. | 250/216 |
| 3,766,080 | 10/1973 | Swinehart et al. | 350/311 X |

Primary Examiner—Eugene La Roche
Attorney, Agent, or Firm—Glenn H. Bruestle; George E. Haas

[57] ABSTRACT

A transparent dome formed from a segment of a spherical shell of uniform thickness has an optical filter on its surface. A photodetector is positioned on the concave side of the dome so that light rays passing through the dome, normal to its surface, will fall on the center of the photodetector.

7 Claims, 3 Drawing Figures

PHOTODETECTOR FILTER STRUCTURE

BACKGROUND OF THE INVENTION

The present invention relates to optical filters and more particularly to such devices for photodetectors.

In many applications of photodetectors, filters are used to isolate spectral bands of light so that the devices are sensitive to only a narrow spectral bandwidth. Both interference and absorption filters are commonly used in these applications. Problems have often arisen in the application of flat filters of these types when the device which they are used is to have a fairly uniform response to light from wide incident angles, for example from 0° to 45°. The spectral transmission characteristic of filters varies depending upon the incident angle at which the light strikes the filter. In the case of an interference type of filter, increasing the angle of incidence shifts the spectral transmission characteristic to shorter wavelengths. In the case of absorption type filters, the attenuation at a given wavelength varies exponentially with the length of path through the filter. For a flat filter, the path length varies inversely with the cosine of the angle of refraction within the filter. The result can be a shift of the cut-off characteristic of the absorption filter. Shifting of the passband of spectral transmission is highly undesirable for devices which are intended to be responsive over a limited and specific spectral bandwidth.

SUMMARY OF THE INVENTION

A filter structure for a photodetector has a transparent dome. The dome is a segment of a spherical shell of uniform thickness. An optical filter is positioned on the surface of the dome. The photodetector is positioned on the concave side of the dome so that light passing through the dome, normal to its surface falls on the center of the photodetector.

DETAILED DESCRIPTION OF THE INVENTION

Figure 1:
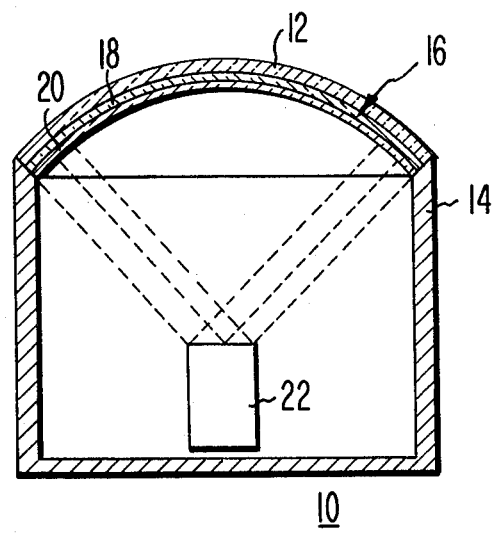
FIG. 1 is a sectional view of a filter structure according to the present invention.

With initial reference to FIG. 1, a photodetector filter structure 10 has a dome 12 of a transparent material, such as quartz or glass. The dome 12 is a segment of a spherical shell having uniform thickness. The size of the dome depends on the angle of view of the filter structure 10. The dome 12 has a concave and a convex surface and may be attached to an enclosure 14 so that its concave surface is facing toward the inside of the enclosure. A spectral bandpass optical filter 16 is on the surface of the dome 12 and therefore has a spherical shape. The filter 16 may be on either the concave or the convex surface of the dome 12; the concave surface is preferred since it is on the interior of the enclosure where the filter is protected from damage.

The optical filter 16, in the embodiment shown in FIG. 1, comprises both an interference filter 18, and an absorption filter 20, both designed to isolate a particular part of the optical spectrum. Conventional filter materials may be used for both the interference and the absorption filters 18 and 20. For example the interference filter may be the Fabry-Perot type having two partially transmissive silver films separated by a dielectric film such as zinc sulfide. The absorption filter may be formed from color filter glass. In addition, either or both the interference and absorption filters 18 and 20 may be formed of several different filters, responsive to different wavelengths and layered together. A photodetector 22, such as a head-on type photomultiplier tube having a transmissive type photocathode, is spaced from the concave surface of the dome 12 so that light passing through the dome normal to its surface will fall on the center of the photodetector. In the embodiment shown in FIG. 1, photodetector is at the center of the dome's curvature. The term light as used herein includes ultra-violet and infra red as well as visible radiation.

Due to the curvature of both the dome 12 and the optical filter 16, the light rays which strike the photodetector 22 will have passed through the filter 16 more normal to the surface of the optical filter than in conventional flat filters. The light therefore, can impinge upon the photodetector from wide angles with a relatively small shift in the spectral passband of the filter 16. When the radius of the dome 12 is relatively large as compared to the radius of the face of the photodetector, the light rays which pass through the filter 16 and strike the photodetector are all nearly normal to the surface of the filter. For example, a radius ratio of 8:1 insures that all the light rays which strike the photodetector are essentially normal to the surface of the filter 16. The deviation for normality may be decreased by increasing the ratio of the dome radius to that of the photodetector. This length relationship will also be true if a non-circular photodetector surface is used.

Figure 2:
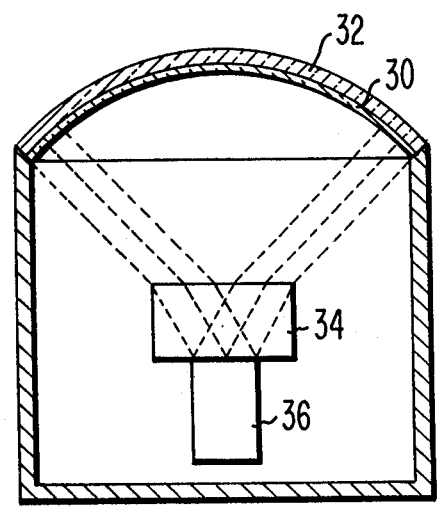
FIG. 2 is a sectional view of a second embodiment of the present filter structure.
Figure 3:
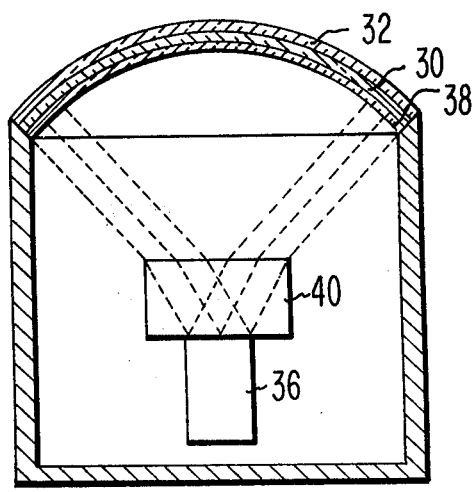
FIG. 3 is a sectional view of a third embodiment of the present filter structure.

In some applications, it may be disadvantageous to have the absorption filter on the curved dome 20. For example, the absorption filter may be very difficult to fabricate in a spherical shape or considerations of cost may dictate a smaller flat absorption filter. In this case, since absorption filters are normally least sensitive to the spectral transmission variation with variation in the angle of incidence as compared with interference filters, a flat absorption filter can be used in the filter structure. FIG. 2 shows a practical compromise, a spherical interference filter 30 and a flat absorption filter 34. The interference filter 30 on the surface of the dome 32 which is similar to the dome 12 of FIG. 1. The flat absorption filter 34 is positioned between the dome 32 and the photodetector 36 so that the light passing through the dome 32 and striking the photodetector will pass the absorption filter. With reference to FIG. 3, when the absorption filter is formed of several layers of different filters, some of the layers may be deposited on the dome 32 so as to form a spherical absorption filter 38. The remainder of the filter layers, which are composed of material which is difficult to fabricate in a spherical shape form a flat absorption filter 40 similar to the absorption filter 34 shown in FIG. 2.

It is preferred that the flat absorption filter in either FIG. 2 or FIG. 3 be attached to the head of the photodetector in order to reduce reflective loss In these embodiments the photodetector is still positioned so that radiation having a normal angle of incidence to the surface of the dome will intersect at the center of the photodetector. However, this point of intersection has shifted relative to the dome's position as a result of refraction by the flat absorption filter.

We claim:

1. An optical filter structure for a photodetector comprising:
   a transparent dome in the shape of a segment of a spherical shell of uniform thickness, said dome positioned in front of the photodetector with a concave surface of the dome facing the photodetector so that light passing through the dome normal to the dome's surface will intersect at the center of the photodetector;
   an interference filter on the surface of the dome; and
   an absorption filter between the dome and the photodetector.

2. The device as in claim 1 wherein the interference filter is on the concave surface of the dome.

3. The device as in claim 1 wherein the interference filter is on the concave surface of the dome and the absorption filter is on the interference filter.

4. The device as in claim 1 including an enclosure having an aperture over which the dome is mounted so that the concave surface of the dome faces inward, the enclosure containing the photodetector.

5. The device as in claim 1 wherein the absorption filter is on the transparent dome.

6. The device as in claim 1 wherein the absorption filter comprises a flat absorption filter positioned between the concave surface of the dome and the photodetector so that all of the light passing through the dome and striking the photodetector passes through the absorption filter.

7. The device as in claim 6 wherein the flat absorption filter is attached to the photodetector.

* * * * *